Oct. 1, 1968    W. S. DAANSEN    3,403,859
VENTURI WASHER
Filed Dec. 27, 1965
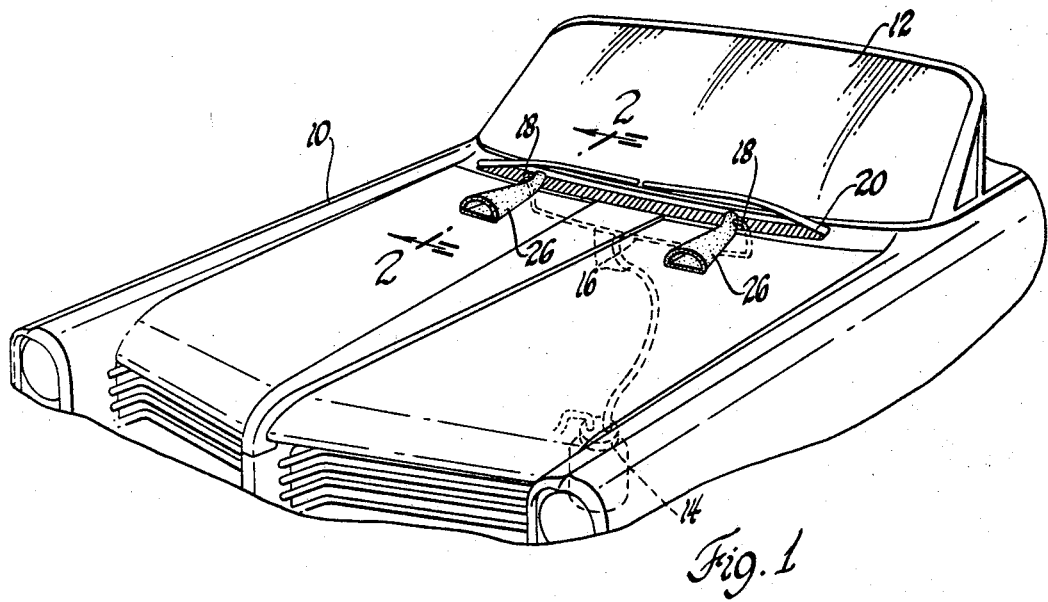
Fig. 1
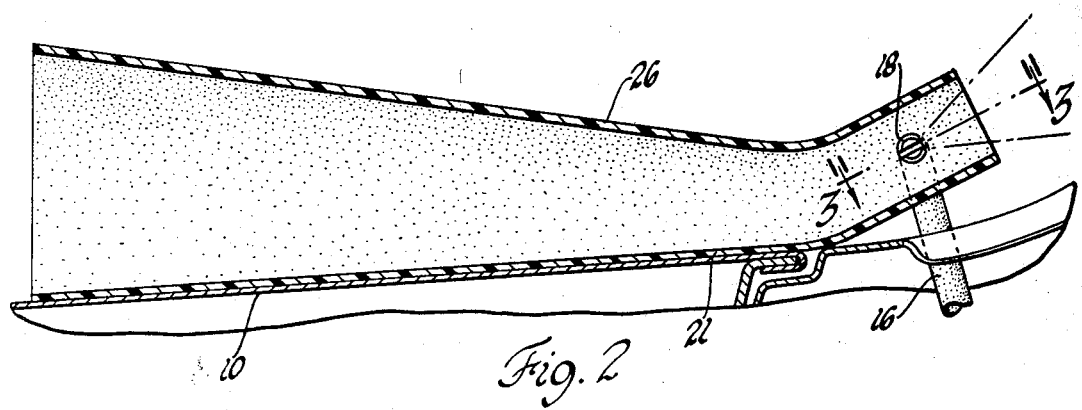
Fig. 2
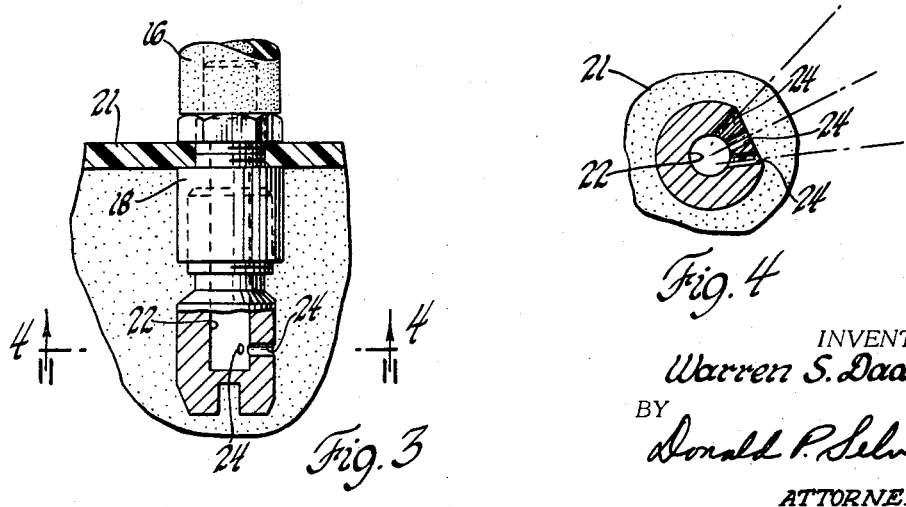
Fig. 3
Fig. 4
INVENTOR.
Warren S. Daansen
BY
Donald P. Selveski
ATTORNEY

United States Patent Office 3,403,859
Patented Oct. 1, 1968

3,403,859
VENTURI WASHER
Warren S. Daansen, Rochester, N.Y., assignor to General Motors Corporation, Detroit, Mich., a corporation of Delaware
Filed Dec. 27, 1965, Ser. No. 516,324
6 Claims. (Cl. 239—284)

ABSTRACT OF THE DISCLOSURE

A windshield washing mechanism for washing the windshield of an automotive vehicle is disclosed. The windshield washing mechanism comprises a source of fluid which is adapted to be selectively dispensed under pressure for washing the windshield, a nozzle in communication with the source of fluid and disposed forwardly of the windshield for directing the fluid toward a predetermined area on the windshield to wash the same and a venturi means surrounding the nozzle and having an inlet for receiving air during vehicle movement and an outlet for directing the air received toward the windshield. The nozzle is disposed within the neck or throat of the venturi and the venturi directs air past the nozzle and forms a substantially annular air shield around the washing fluid being emitted from the nozzle to provide directional stability for the washing fluid and prevent random lateral dispersement thereof irrespective of the speed at which the vehicle is moving.

---

This invention relates to windshield washing mechanisms and more particularly to a fluid stream control adapted for use therewith.

In the use of ordinary windshield washing mechanisms, nozzles are generally provided on the front portion of the vehicle which are designed to emit fluid under pressure and direct it toward the windshield to provide washing fluid for cleaning and for lubrication of the windshield wipers. Normally, the jets of the washer outlet are directed at the windshield in an area where the wiper can most efficiently make use of the dispensed fluid to clean the windshield. It becomes evident that with any given placement of the washer nozzle jet, a desired area on the windshield can be hit by the washer stream given some predetermined range of vehicle speeds. However, when washing of the windshield is desired and vehicle speed exceeds a certain optimum dispensing program, the dispensed fluid can miss the mark and result in inefficient or incomplete washing.

It is an object of the present invention to provide a fluid stream controlled for use with windshield washing mechanisms that directs the dispensed washing fluid to a particular portion of the windshield regardless of vehicle speed.

It is another object of the present invention to provide an improved windshield washing mechanism having a fluid stream control consisting of an annular air curtain surrounding the area from which a washing fluid is dispensed.

It is still another object of the present invention to provide a venturi type ambient air accelerator which directs accelerated air in a selective manner around the area from which a washing fluid is dispensed toward a windshield to guarantee the movement of the dispensed fluid from the nozzle jets to a predetermined area of windshield regardless of changes in vehicle speed.

It is a further object of the present invention to provide improved apparatus for carrying out the aforementioned objects which is simple and economical to manufacture.

Further objects and advantages of the present invention will be apparent from the following description, reference being had to the accompanying drawings wherein a preferred embodiment of the present invention is clearly shown.

In the drawings:

FIGURE 1 illustrates the subject invention in its operative environment;

FIGURE 2 is a sectional view taken along line 2—2 of FIGURE 1;

FIGURE 3 is a sectional view taken along line 3—3 of FIGURE 2;

FIGURE 4 is a sectional view taken along line 4—4 of FIGURE 3;

Referring to FIGURE 1, a motor vehicle 10 is illustrated as having a windshield 12 facing the front of the vehicle. A combination reservoir-dispenser 14 provides a washing fluid under pressure to line 16 to outlets 18 which are directed at windshield 12 in predetermined areas thereof which will allow windshield wipers 20 to make the most efficient use of the dispensed fluid.

Referring to FIGURE 3, a nozzle or outlet 18 is illustrated as being carried by plate 21 which is a partial sectional view of a venturi 26. It is understood that the hood to which plate 21 is affixed moves relative to windshield 12 when access to the interior portions of the engine compartment is desired. Reservoir 14 is most conveniently located within the engine compartment and outlets 18 are located on a portion of plate 21 near the pivot point of the hood resulting in a minimum of distortion of lines 16 when the hood is opened.

Nozzle 18 is of typical construction wherein one of the lines 16 terminates at one end thereof and an interior passage 22 is provided for communication of fluid to jets 24. Referring to FIGURE 4, the particular nozzle shown has three jets which provide a desired pattern of fluid flow toward the windshield 12 from passage 22.

Referring to FIGURE 2, nozzle 18 is illustrated as being carried by a side wall of a venturi member 26 so that jets 24 are directed toward the windshield. Venturis 26 are shown in FIGURE 1 in their operative position on plate or hood 21. Venturis 26 are illustrated in the embodiment of FIGURE 1 as being located on top of the hood, but it is obvious that the placement of the venturis could be changed to satisfy engineering or aesthetic considerations. It is seen in FIGURE 2 that nozzle 18 is carried at the narrow neck section of venturi 26 which is the area in which the air flowing through venturi 26 is accelerated to its maximum speed.

In operation, the subject system functions on the principle that air entering the bell end of venturi 26 will be accelerated as it moves within the decreasingly smaller wall area to the narrow neck outlet portion. Outlets 18 are normally positioned on plate 21 in a manner allowing a dispensed fluid from jets 24 to be directed at predetermined areas on windshield 12. As vehicle speed increases, the air entering venturi 26 from the front of vehicle 10 increases in volume and consequently exits at an increasingly faster rate. As a vehicle is accelerated, air also flows over the windshield at a faster rate resulting in increasingly greater deflection tendency of the fluid dispensed from jets 24 during actuation of the windshield washers. The present invention as best seen in FIGURE 2, provides a stream of air past nozzle 18 in the area where the fluid is dispensed from jets 24 and forms a substantially annular shaped air current extending from venturi 26 toward the windshield enveloping the fluid pattern as dispensed from jets 24. This air current effectively restricts the dispersion of the fluid emitted from jets 24 resulting in a controlled fluid stream that tends to strike the windshield at the area from which the fluid can be most efficiently used for cleaning by the windshield wipers. It should be noted that the speed of the air stream from venturi 26 is directly proportional to vehicle speed and the tendency of the fluid dispensed from jets 24 to disperse beyond predetermined limits is also proportional to vehicle speed. Therefore, the present invention provides a means responsive to vehicle speed to restrict the wide dispersion of fluid dispensed from jets 24 during the operating conditions that actually cause the dispersal. Consequently, a wide dispersal of the dispensed fluid is effectively prevented under any operating conditions and the washer jets provide a pattern on the windshield substantially the same regardless of vehicle speed.

It is understood that the location of venturis 26 are shown in FIGURE 1 as being located on top of the vehicle hood in order to more clearly set forth the theory of operation. It is obvious that the venturis could be placed in other locations, such as under the hood near the leading edge with the accelerated air being emitted in the area where the nozzles are located. It is also possible to provide a lead into venturis 26 from the engine exhaust manifold which would heat the air being driven past the nozzles 18 resulting in effective deicing during cold weather operation as well as providing a deicing medium for the surface of the windshield near the area where the washing fluid is dispensed. The only requirement for the location of venturis 26 is that ram air from the outside of the vehicle be packed into the venturi at a rate proportional to vehicle speed.

While the embodiment of the present invention, as herein disclosed, constitutes a preferred form, it is to be understood that other forms might be adopted.

What is claimed is as follows:

1. A windshield washing mechanism for use in cleaning a windshield of a vehicle comprising a first source of fluid which is adapted to be dispensed under pressure, first means in communication with said first source of fluid for directing the same toward a predetermined area on the windshield, second means including venturi means surrounding said first means for receiving air during vehicle movement and for directing said air received toward said windshield, said venturi means directing air past said first means and forming a substantially annular air shield around said fluid when being emitted from said first means to provide directional stability for the emitted fluid and prevent random lateral dispersal thereof.

2. A windshield washing mechanism as defined in claim 1 wherein said venturi means has a throat portion, and wherein said first means is a nozzle having at least one opening therein positioned in the throat portion of the venturi means.

3. A windshield washing mechanism as defined in claim 2 wherein said nozzle is supported by said venturi means and disposed generally centrally within the throat portion thereof.

4. In an automotive vehicle having a windshield, a windshield washing mechanism carried by said vehicle, said windshield washing mechanism comprising a first source of fluid which is adapted to be selectively dispensed under pressure for washing the windshield, first means in communication with said first source of fluid and disposed forwardly of said windshield for directing said fluid toward a predetermined area on said windshield to wash the same, venturi means surrounding said first means and having an inlet for receiving air during vehicle movement and an outlet for directing said air received toward said windshield, said venturi means directing air past said first means and forming a substantially annular air shield around said fluid when emitted from said first means to provide directional stability for the emitted fluid and prevent random lateral dispersal thereof.

5. In an automotive vehicle as defined in claim 4 wherein said venturi means comprises a throat portion and a flared inlet portion whose diameter progressively increases proceeding from said throat portion toward said inlet, and wherein said first means is a nozzle having an opening for directing said fluid in a jet stream in the direction of movement of the air through the venturi means, said nozzle being supported by said venturi means and disposed generally centrally within the throat portion thereof.

6. In an automotive vehicle as defined in claim 5 wherein said vehicle has a hood supported for pivotal movement relative to the windshield, and wherein said venturi means is carried by said hood at a location adjacent the axis of pivotal movement.

References Cited

UNITED STATES PATENTS

| | | | |
|---|---|---|---|
| 1,882,337 | 10/1932 | Neill | 239—284 X |
| 2,719,339 | 10/1955 | Clem. | |
| 2,986,360 | 5/1961 | Rutten | 239—171 X |

M. HENSON WOOD, Jr., *Primary Examiner.*

M. Y. MAR, *Assistant Examiner.*